Figure 1:
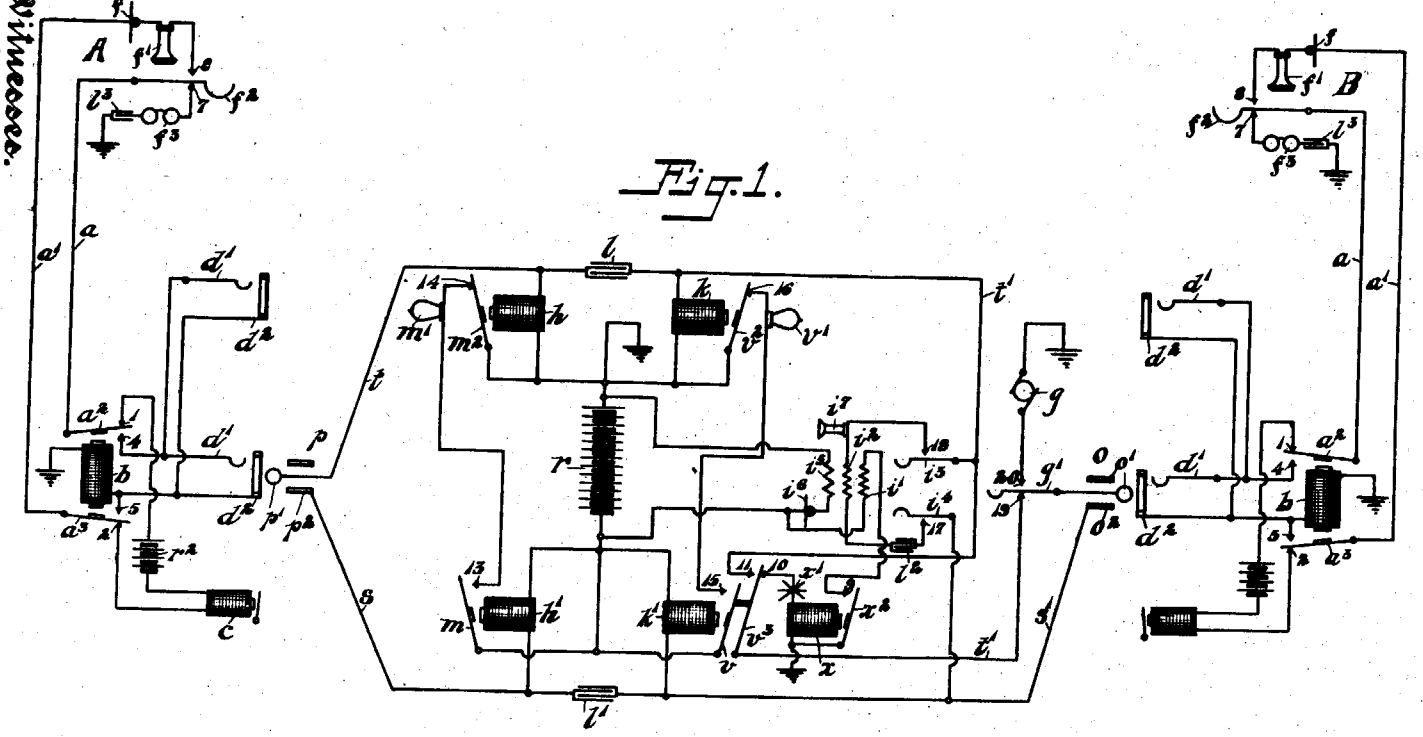

No. 12,090.

REISSUED MAR. 3, 1903.

W. W. DEAN.

TESTING SYSTEM FOR TELEPHONE LINES.

APPLICATION FILED JAN. 31, 1903.

2 SHEETS—SHEET 1.

Witnesses.

R. H. Burpinel

Gizelle Reder

Inventor:-
William W. Dean,
by Robert Lewis Ames
Attorney.

No. 12,090.

REISSUED MAR. 3, 1903.

W. W. DEAN.

TESTING SYSTEM FOR TELEPHONE LINES.

APPLICATION FILED JAN. 31, 1903.

2 SHEETS—SHEET 2.

Witnesses.

P. H. Bulfinch

Gazelle Bieder.

Inventor:-

William W. Dean, by Robert Lewis Ames,

Attorney.

UNITED STATES PATENT OFFICE.

WILLIAM W. DEAN, OF CHICAGO, ILLINOIS, ASSIGNOR TO THE KELLOGG SWITCHBOARD AND SUPPLY COMPANY, OF CHICAGO, ILLINOIS, A CORPORATION OF ILLINOIS.

TESTING SYSTEM FOR TELEPHONE-LINES.

SPECIFICATION forming part of Reissued Letters Patent No. 12,090, dated March 3, 1903.

Original No. 717,973, dated January 6, 1903. Application for reissue filed January 31, 1903. Serial No. 141,390.

*To all whom it may concern:*

Be it known that I, WILLIAM W. DEAN, a citizen of the United States, residing at Chicago, in the county of Cook and State of Illinois, have invented a certain new and useful Improvement in Testing Systems for Telephone-Lines, of which the following is a full, clear, concise, and exact description, reference being had to the accompanying drawings, forming a part of this specification.

My invention relates to a testing system for telephone-lines. Testing systems as heretofore commonly employed have embodied means whereby the operator may touch the tip of her calling-plug to the testing-terminal of the switch-socket to thereby send, if the line is busy, a current through the responsive device of the testing system—as, for instance, through the receiver of the operator's telephone set. The operator hearing a click in her telephone will know that the line is busy. On the other hand, if she hears no click she will know that the line is idle. In these systems as usually constructed heretofore a special test-terminal has been provided upon the switchboard, to which the tip of the testing-plug is adapted to be touched in the making of the test. The potential of the special testing-terminal may be readily adjusted to the required amount to give the desired low click in the operator's telephone. Moreover, due to the employment of the special testing-terminal, the touching of the tip of the plug thereto to offer another path for current does not produce a click in the telephone of the subscriber whose line is being tested.

The object of the present invention is to provide a testing system particularly adapted to that class of telephone-lines wherein no special testing-terminal is provided upon the switchboard, one of the main-line terminals of the switch-socket or a terminal connected with one side of the talking-circuit during a connection being relied upon for testing purposes. In this type of switchboard the potential at the switchboard-terminal used for testing will depend upon the voltage of the source of electricity employed for energizing the microphone at the substations and the various signaling apparatus. The voltage of this battery will be determined by the length of the lines and the nature of the signaling apparatus employed, and cannot therefore be readily adjustable to suit the requirements of the testing apparatus. The potential at the testing-terminal is therefore considerably greater than it is where a special test-terminal is employed. When, therefore, the tip of the testing-plug is touched to the line-terminal, thus affording an additional path for current and lowering the potential of the line-terminal, a click will be caused in the receiver of the subscriber whose line is being tested, and, due to the high potential of the line-terminal, this click will be of such a magnitude as to be quite objectionable. It is necessary, therefore, in providing a test for this type of telephone-line to obviate this objectionable click in the subscriber's telephone. Accordingly I provide for each operator a testing-circuit having a high resistance and preferably also a high impedance and which preferably takes the form of a relay which is adapted to be connected with all of the cords controlled by said operator, the relay or test-resistance device being normally in circuit with the tips of all of the calling or testing plugs. When, therefore, the tip of any one of the plugs is touched to the testing-terminal upon the switchboard, a current will traverse the relay or test device if the line is busy. The relay or device thereupon acts to control a local circuit containing a suitable source of electricity and the operator's telephone or other responsive device. The strength of the current flowing in the local circuit may be readily adjusted as desired, and in this manner the strength of the click in the operator's telephone may be suitably adjusted. By making the relay of high resistance and with many turns the current flowing through the relay and test-conductor will be but slight, and, due to the large number of turns, this current will effectively operate the relay. The relay should have considerable impedance, and this will cause the current traversing the relay and test-conductor to rise in value gradually. In consequence the touching of the tip of the testing-plug to the testing-terminal varies the potenti thereof slightly, since the added path through the testing apparatus is of high resistance and, moreover, due to the impedance of the relay, the variation of the potential is gradual. The result is that the testing-current traverses the relay and test-circuit without in any manner affecting the receiver of the subscriber whose line is being tested. While I preferably provide one relay or responsive device for all of the calling-plugs controlled by one operator, this of course is not an essential feature of the invention, as a relay may be provided for each connecting-cord or for such number of connecting-cords as may be desired. I further provide means whereby the insertion of a calling-plug in the switch-socket of a called subscriber will serve to automatically disconnect the testing device or relay from the tip of the plug, and whereby the removal of the plug from the socket serves to automatically reconnect the testing device or relay with the tip of the calling-plug.

A further feature of my invention is the provision of means whereby the testing apparatus may be automatically connected with and disconnected from the tip of the calling-plug without the provision of a third terminal upon the connecting-plug, as has been the usual practice heretofore.

I have illustrated my invention in the accompanying drawings, in which—

Figure 2:
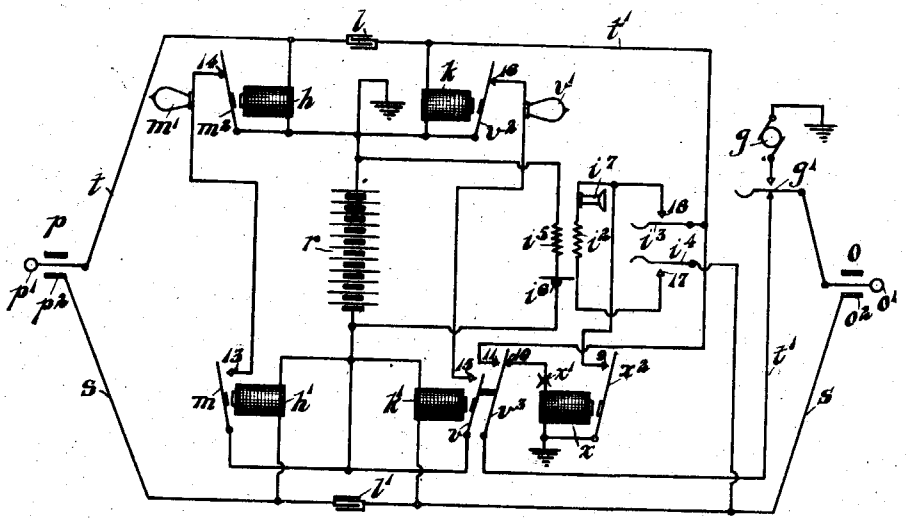
Figure 3:
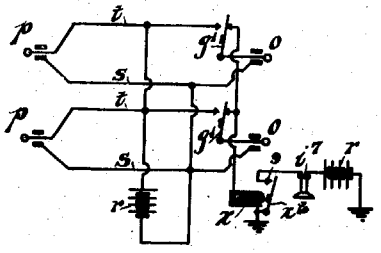

Figure 1 is a diagram illustrating two telephone-lines and the central-station apparatus of my invention. Fig. 2 is a diagram showing a modification of the central-station apparatus. Fig. 3 is a diagram showing the manner in which a single testing-relay is associated with a plurality of cord-circuits.

Like characters refer to like parts throughout the several figures.

The telephone-lines may be of any approved type, and I have illustrated telephone-lines of the well-known "Dunbar" type. It will be understood, however, that my invention is equally applicable to any specific form of telephone-circuit. I have shown the substation A provided with two limbs $a$ $a'$, extending to the central station and terminating, respectively, in springs $a^2$ $a^3$, spring $a^2$ normally resting against contact 1 and the spring $a^3$ against contact 2. Between the contacts 1 and 2 the battery $r^3$ and individual indicator $c$ are connected. Contact 4 is connected with line-springs $d'$ $d'$ upon the several sections of the switchboard, and the contact 5 is connected with the line-thimbles $d^3$ $d^3$. The relay $b$ is connected between the contact 5 and ground. When the relay $b$ is energized, springs $a^2$ $a^3$ are attracted to cut out indicator $c$ and to connect limbs $a$ and $a'$ with the terminals of the switch-socket. At the substation the usual microphone $f$ and receiver $f'$ are connected with the contact 8, and the switch-hook $f^3$, which is adapted to engage contact 8 when the receiver is lifted, normally rests against contact 7, which is connected to ground through bell $f^3$ and condenser $l^3$.

The specific form of telephone-line herein illustrated is not claimed in this application.

The substation B shown upon the right is similar to that described in connection with subscriber A, and like parts have been indicated by the same reference-letters.

The answering-plug $p$ is provided with the usual tip $p'$ and sleeve $p^2$, the former connected with strand $t$ and the latter with strand $s$. The calling-plug $o$ is provided with tip $o'$ and sleeve $o^2$, the former being connected with strand $t'$ and the latter with strand $s'$. The strands $t$ and $t'$ are united through a condenser $l$ and the strands $s$ and $s'$ through a condenser $l'$. The central energizing-battery $r$ is connected at one pole with the strands $t$ and $t'$ through relays $h$ and $k$, having a resistance usually of about fifty ohms. The opposite pole of said battery $r$ is connected with strands $s$ and $s'$ through relays $h'$ and $k'$, which also have preferably a resistance of about fifty ohms. One pole of the battery is grounded, as shown. The relay $h$ controls contacts $m^2$ and 14, and the relay $h'$ controls contacts $m$ and 13, the contact $m$ being connected with one side of battery $r$ and the contact $m^2$ with the opposite side. In circuit with the contacts is the lamp $m'$, which constitutes the clearing-out signal. Likewise the relay $k$ controls contacts $v^2$ and 16, and the relay $k'$ controls contacts $v$ and 15. In circuit with the contacts is the clearing-out lamp $v'$. Connected with the contact-spring $v$ and insulated therefrom is a supplemental contact $v^3$, adapted when relay $k'$ is energized to engage contact 11. The spring $v^3$ and contact 11 are interposed in the circuit of strand $t'$, and when spring $v^3$ rests against contact 10 said strand is opened, and is closed when spring $v^3$ is moved against contact 11. Contact 10 is connected to ground through relay $x$ or other test receiving and responsive device, which preferably possesses high resistance and impedance—say five hundred ohms. The relay $x$ is common to a plurality of cord-circuits usually common to all of the cords controlled by one operator, and the conductors extending to the contacts 10 of the different cord-circuits branch from the point $x'$. The relay $x$ controls contacts $x^2$ 9, the former being connected with ground and the latter being in the present instance connected through the tertiary winding $i'$ of the operator's telephone set. The secondary winding $i^2$ is connected between the contacts 17 and 18 of the listening-key and is included in circuit with a condenser $l^2$. The springs $i^3$ $i^4$ of the listening-key are connected, respectively, with the strands $t'$ and $s'$. The primary $i^5$ and the microphone $i^6$ are connected between the opposite sides of the battery $r$. The telephone-receiver $i^7$ is connected in circuit with the secondary $i^2$. The ringing-key $g'$ is connected in the strand $t'$ and normally rests against contact 19 and is adapted to engage contact 20 to close circuit through generator $g$.

If subscriber A desires to converse with subscriber B, he lifts his telephone-receiver from the hook, thereby closing the circuit of battery $r^2$ through indicator $c$ to actuate the same. The operator thereupon lifts answering-plug $p$ and inserts the same in the circuit belonging to line A. Circuit is thus closed from ground through battery $r$, strand $s$, sleeve $p^2$, thimble $d^2$, relay $b$ to ground, and said relay is energized to attract springs $a^2$ and $a^3$, thereby cutting out of circuit indicator $c$ and connecting the limbs $a$ $a'$ with the line-terminals $d'$ $d^2$. The operator then bridges in her telephone in the usual manner and receives the number of the called subscriber. Learning that subscriber B is wanted, she lifts the calling-plug $o$, which also serves as a testing-plug, and touches the tip $o'$ thereof to the thimble $d^2$ belonging to subscriber B. If subscriber B is connected for conversation at another section of the switchboard, the thimble $d^2$ will be raised to a potential different from the earth due to its connection with the energizing-battery $r$ at the other section of the switchboard. When, therefore, the tip $o'$ is touched to the thimble $d^2$, current will flow from the thimble through the tip to strand $t'$, thence through contacts $v^3$ and 10 and relay $x$ to ground. The circuit of battery $r$ may be traced over the strand $s'$ of the cord-connector at the section of the switchboard where connection is made, thence to the sleeve of the plug and the line-thimble to thimble $d^2$ at the board where the test is being made, thence to earth by the path above traced. As the relay $x$ is of very high resistance, the current thus shunted through the relay is quite small in quantity and does not materially lower the potential of the thimble $d^2$. Moreover, since the relay possesses high impedance the current is drawn off through the relay gradually and whatever lowering of potential takes place at the test-thimble takes place gradually. Consequently the called subscriber who is in conversation through a connection at another section of the switchboard hears no objectionable click in his telephone due to the test. The energizing of relay $x$ closes circuit of battery $r$ through tertiary winding $i'$, contacts 9 and $x^2$ to ground and back to the battery. The current through the tertiary winding induces current in the secondary $i^2$, which traverses the operator's telephone-receiver. The operator thus hears a click in her telephone when the relay is actuated, and the relay is actuated whenever the tip of the testing-plug is touched to the thimble of a line which is connected for conversation.

Assuming that the operator finds the line of subscriber B not busy, the relay will remain quiescent when the tip of the plug is touched to the test-terminal, and as she will hear no click in her telephone she will know that the line is idle. Thereupon she inserts the calling-plug $o$ in the switch-socket belonging to subscriber B. The insertion of the calling-plug $o$ in the socket belonging to subscriber B closes the circuit of battery $r$ from ground through relay $k'$, strand $s'$, sleeve $o^2$, thimble $d^2$, through relay $b$ to ground. Relay $b$ is thus actuated to connect limbs $a$ $a'$ of the line B with the terminals of the switch-socket, and relay $k'$ is energized to separate contacts $v^3$ and 10, thereby disconnecting relay $x$ from the testing-tip $o'$ and closing together contacts $v^3$ and 11, thereby completing the continuity of the strand $t'$. The operator then depresses the ringing-key $g'$ and calling-currents from generator $g$ pass through tip $o'$, line-spring $d'$, limb $a$ to ground through the bell $f^2$, thereby actuating the bell. Subscriber B thereupon responds and lifts his receiver from the hook, thus closing together the limbs $a$ and $a'$. The energizing of relay $k'$ also closes together contacts $v$ and 15, thereby completing the circuit of battery $r$ through the lamp $v'$ to light the same. When subscriber B lifts his telephone from its hook, thus closing together limbs $a$ and $a'$, the relay $k$ is energized to open the circuit through the lamp, and the operator, seeing the lamp extinguished, knows that subscriber B has responded. The circuit of battery $r$ during conversation is closed through relays $k$ and $k'$, strand $t'$ and $s'$, and limbs $a$ and $a'$ of the line B. The circuit of battery $r$ is also closed through relays $h$ and $h'$, strands $t$ and $s$, and limbs $a$ and $a'$ of the line A. The circuit through lamp $m'$ is thus opened. Accordingly the lamps $m'$ and $v'$ are extinguished while the subscribers are in conversation.

When the subscribers have completed conversation, they hang up their receivers, thus separating the limbs $a$ and $a'$ at the substations and opening the circuit of battery $r$ through the relays $h$ and $k$. The relays $h'$ and $k'$ remain energized, since a path for the current is afforded to ground through the relays $b$ $b$. The deënergizing of the relays $h$ and $k$, while the relays $h'$ and $k'$ remain energized, closes the local circuits through the lamps $m'$ and $v'$, thereby lighting the same and giving the signal for disconnection. Should either subscriber—as, for instance, subscriber A—desire a reconnection with another subscriber, he can by oscillating his switch-hook in the usual manner alternately energize and deënergize relay $h$ to light and extinguish lamp $m'$, and thus signal for a new connection. When the operator receives the signal for disconnection, she withdraws the plugs $p$ and $o$ from the sockets, and the circuits of battery $r$, through the relays $h'$ and $k'$, are thus opened to deënergize said relays and open the circuits through the lamps $m'$ and $v'$. The deënergizing of the relay $k'$ separates spring $v^3$ from contact 11 and closes the same against contact 10, to thereby open the strand $t'$ and connect the tip $o'$ to ground through the relay $x$.

In Fig. 2 I have illustrated a modification of my invention in which the contacts $x^2$ and 9 of relay $x$ are connected directly in circuit with the telephone-receiver $i^7$ instead of in circuit with a tertiary winding $i'$. The relay-contacts $x^2$ and 9 thus directly control the circuit containing the telephone-receiver. It will be understood that instead of a telephone-receiver any other responsive device may be employed for testing purposes. It is also evident that the relay $x$ may be replaced by any other test-responsive device or test-indicator, but without the advantage of some of the features herein described.

I disclaim herein the matter claimed in the application of Francis W. Dunbar for telephone-switchboards, filed August 17, 1900, Serial No. 27,131.

Having described my invention, what I claim as new, and desire to secure by Letters Patent, is—

1. In a telephone system, the combination with a telephone-line having a plurality of testing-terminals, of testing apparatus including a plurality of testing-contacts, a relay common to said contacts and in circuit therewith, a responsive device controlled by said relay and actuated whenever a testing-current flows over the testing-circuit from any of said contacts, substantially as described.

2. The combination with telephone-lines having each a testing-contact connected directly with one side of the talking-circuit, of testing apparatus including a plurality of testing-terminals, a relay common to said terminals in circuit therewith, and a responsive device controlled by said relay, substantially as described.

3. The combination with a telephone-line and a charging source of electricity, of a testing-terminal for said line connected directly with one side of the talking-circuit and testing apparatus including a testing-contact, a relay in circuit therewith, a responsive device controlled by said relay, and means for automatically disconnecting said relay from the circuit when a connection is made with the line, substantially as described.

4. The combination with a telephone-line having one of the main-line terminals serving as a test-terminal, of testing apparatus comprising a testing-terminal, a relay in circuit therewith and a responsive device controlled by said relay, and means to automatically disconnect said relay when a connection is made with the line, substantially as described.

5. In a telephone system, the combination with a telephone-line having testing-contacts, of testing apparatus including a testing-terminal adapted to be brought into contact with the testing-contacts of said line, a relay normally connected with said testing-terminal, a responsive device controlled by said relay, and means for disconnecting said relay from said testing-terminal, substantially as described.

6. In a telephone system, the combination with a connecting-plug, of a relay normally connected with the terminal thereof, a responsive device controlled by said relay, and means for disconnecting said relay from said terminal when the plug is inserted in a switch-socket, substantially as described.

7. The combination with a plurality of connecting-plugs, of a relay normally connected with the terminals of said plurality of plugs, a responsive device controlled by said relay, and means controlled by each plug for disconnecting said relay from the terminal thereof, substantially as described.

8. The combination with a connecting-plug and the strand associated therewith, of a relay, means for normally connecting said relay with the terminal of said plug, and for opening the circuit through said strand, a responsive device controlled by said relay, and means actuated by the insertion of the plug in a switch-socket for disconnecting said relay and for completing the circuit through said strand, substantially as described.

9. The combination with a connecting-plug and a pair of strands associated therewith, of a relay normally connected with one of said strands, a responsive device controlled by said relay, and an electromagnetic device controlled by the circuit through the other of said strands, for disconnecting said relay from the terminal of the plug normally connected therewith, substantially as described.

10. The combination with a connecting-plug, and the strands associated therewith, of a relay and a responsive device controlled thereby, means for normally connecting said relay with one terminal of said plug and for opening the strand associated with said terminal, and an electromagnetic device controlled by the circuit through the other strand for disconnecting said relay and completing the circuit through said first-mentioned strand, substantially as described.

11. The combination with a connecting-plug, having a pair of strands connected with the respective terminals thereof, of a relay normally connected with one of said strands, a responsive device controlled by said relay, an electromagnetic device for disconnecting said relay from said terminal, and means for closing circuit through said electromagnetic device and said second strand upon the insertion of said plug in a switch-socket, substantially as described.

12. The combination with a connecting-plug, of a testing device normally connected with one terminal thereof, means for closing circuit through the other terminal of said plug upon the insertion of the same in a switch-socket, and means operated by current over the circuit so closed by the plug to disconnect said testing apparatus from the first-mentioned terminal, said other terminal being included in the talking-circuit when a connection exists, substantially as described.

13. The combination with a connecting-plug, of testing apparatus normally connected with the tip of said plug; means for closing circuit through the sleeve of said plug upon the insertion of said plug in a switch-socket and means operated by current over the circuit so closed to disconnect said testing apparatus from said tip, said sleeve forming part of the talking-circuit when a connection exists, substantially as described.

14. The combination with a connecting-plug having a pair of terminals and strands connected with said respective terminals, of testing apparatus, means for normally connecting said testing apparatus with one terminal of said plug and for opening the strand connected with said terminal and an electromagnetic device associated with the other strand and adapted to be energized when the plug is inserted in the switch-socket to disconnect said testing apparatus from the terminal normally connected therewith, substantially as described.

15. The combination with a connecting-plug and a pair of strands connected with the terminals thereof, of a source of energy and an electromagnet bridged between said strands, one side of said source being connected with a third conductor, testing apparatus, means for normally connecting said testing apparatus with one terminal of said plug and for normally opening the strand connected with said terminal, a telephone-line having one limb of the talking-circuit connected with said third conductor, and means for closing the circuit of said source through said electromagnetic device, the limb of said telephone-line and said third conductor upon the insertion of the plug in the switch-socket to thereby actuate said electromagnetic device and disconnect said testing apparatus from the terminal normally connected therewith, substantially as described.

16. The combination with telephone-lines having testing-contacts connected directly with one side of the talking-circuit when the lines are switched for use, of a cord-circuit and a central source of current to furnish current for talking associated with the lines, testing apparatus comprising a testing-terminal to coöperate with one of said contacts in testing, a test-responsive device in circuit with said terminal, the testing-circuit being of high resistance whereby when a busy line is tested the change of current therein is reduced, and automatic means to remove said high resistance from the circuit when a connection is established, substantially as described.

17. The combination with telephone-lines having testing-contacts connected directly with one side of the talking-circuit when the lines are switched for use, of a cord-circuit and a central source of current to furnish current for talking purposes associated with the lines, testing apparatus comprising a testing-terminal to coöperate with one of said contacts in testing, a high-resistance and test-responsive device in circuit with said terminal, and electromagnetic means to remove the resistance during the conversation, substantially as described.

18. The combination with telephone-lines having testing-contacts connected directly with one side of the talking-circuit during a connection, of a cord-circuit and a central source of current to furnish current for talking purposes associated with the lines, testing apparatus comprising a testing-terminal to coöperate with one of said contacts in testing, a high-resistance and test-responsive device in circuit with said terminal, and means to automatically remove the same during a conversation, substantially as described.

19. The combination with telephone-lines having testing-contacts connected directly with one side of the talking-circuit during conversation, of a cord-circuit and a central source of current to furnish current for talking purposes associated with the lines, testing apparatus comprising a testing-terminal to coöperate with a test-contact when testing, a high-resistance and test-responsive device in circuit with said terminal, and means to automatically remove the same upon the connection of the cord-circuit with the line, substantially as described.

20. The combination with telephone-lines having testing-contacts connected directly with one side of the talking-circuit during conversation, of a cord-circuit and a central source of current to furnish current for talking purposes associated with the lines, testing apparatus comprising a testing-terminal to coöperate with said contacts, a test-responsive device in circuit with said terminals, the testing-circuit being of high resistance to prevent a large variation of the current upon the line when tested, and means automatically actuated when a connection is established for cutting out said resistance, substantially as described.

21. The combination with telephone-lines having testing-contacts connected directly with one side of the talking-circuit during a connection, of a cord-circuit and central source of current to furnish current for talking purposes associated with the lines, testing apparatus comprising a testing-terminal to coöperate with said contacts, a test-responsive device in circuit with said terminal, said latter circuit being of high resistance or impedance to prevent a large or sudden variation of current on the line when tested, and electromagnetic means automatically energized when a connection is established to cut out said high resistance or impedance, substantially as described.

22. The combination with telephone-lines having testing-contacts connected directly with one side of the talking-circuit during conversation, of a cord-circuit and central source of current to furnish current for talking purposes associated with the lines, testing apparatus comprising a testing-terminal to coöperate with said contacts, a test-responsive device in circuit with said terminal, the test-circuit being of high resistance and impedance to prevent a large and sudden variation of current on the line when tested, and means to automatically cut out said resistance during a conversation, substantially as described.

23. The combination with telephone-lines having testing-contacts connected directly with one side of the talking-circuit during a connection, of a cord-circuit and a central source of current to furnish current for talking purposes associated with the lines, testing apparatus comprising a testing-terminal to coöperate with said testing-contacts of the lines, a testing-conductor connected with said test-terminal, a high resistance in said conductor to prevent an excess flow of current therethrough when testing, and a relay operated over a strand of the cord-circuit actuated during a conversation to remove said resistance, substantially as described.

24. The combination with telephone-lines having test-contacts connected directly with one side of the talking-circuit during a connection, of a cord-circuit and a central source of current associated with the lines, a testing apparatus comprising a tip-contact upon the plug of the cord-circuit, a testing-conductor from said contact, a high resistance in said conductor, and a relay operated by current flowing over a talking-strand of the cord-circuit during a conversation to remove said resistance, substantially as described.

25. The combination with a telephone-line, of a testing-contact therefor, a cord-circuit, a testing-circuit completed over the tip-strand of the cord-circuit, a high resistance in said circuit, and a relay operated by current flowing over one of the talking-strands of the cord-circuit to remove said resistance, substantially as described.

26. A telephone-line having a testing-contact, a cord-circuit, a testing-circuit completed over the tip-strand of the cord-circuit, a test-responsive device in said circuit, said circuit being of high resistance to cut down the flow of current therein, to the desired extent, and a relay operated over a talking-strand of said cord-circuit to reduce the resistance of said circuit, substantially as described.

27. A telephone-line having a testing-contact, a cord-circuit, a testing-circuit completed over the tip-strand of the cord-circuit, a test-responsive device in said circuit, said circuit being of high resistance to cut down the flow of current therein to the desired extent, and a relay operated over the talking-strand of the cord-circuit to remove said device, substantially as described.

28. The combination with telephone-lines having testing-contacts directly connected with one side of the talking-circuit when the lines are switched for use, a plurality of cord-circuits and a central source of current to furnish current for talking purposes associated with the lines, testing apparatus comprising a testing-terminal for each cord-circuit to coöperate with said contacts in testing, the testing-circuit being common to the said cord-circuits and being of high resistance, and a test-responsive device in said circuit and means automatically actuated to disconnect said testing-circuit from any of the cord-circuits when a connection is established thereby, substantially as described.

29. The combination with telephone-lines having testing-contacts therefor connected directly with one side of the talking-circuits during conversation, of a plurality of cord-circuits and a central source of current associated therewith and adapted to furnish current for talking purposes, testing apparatus comprising a testing-circuit common to said cords, said circuit being of high resistance and impedance, a test-responsive device in said circuit, and means to automatically disconnect said circuit when the cord-circuits are in use for conversation, substantially as described.

30. The combination with telephone-lines, of a testing-contact therefor, cord-circuits, a testing-circuit common to said cord-circuits and completed over the tip-strand of each, the said circuit being of high resistance, and a relay for each cord-circuit and operated by current flowing over one of the talking-strands of the cord-circuit to remove said resistance from the corresponding cord-circuit, substantially as described.

31. The combination with telephone-lines having testing-contacts, of cord-circuits, a testing-circuit common to said cord-circuits and completed over the tip-strand of each, a test-responsive device in the common portion of said circuit, means to cut down the flow of current therethrough, and a relay for each cord-circuit operated over the sleeve talking-strand thereof to disconnect the said common portion of the circuit, substantially as described.

32. In a telephone system, the combination with two or more telephone-line circuits, each provided with one or more spring-jack switches or line-terminals, one or each of said switches being provided with a testing-contact, said testing-contact being connected to one side of the talking-circuit of said line when switched for conversation, of a cord-circuit terminating in a plug at each end, said plug being provided with contact-terminals adapted to register with the contacts of said spring-jack switches, an operator's listening-key associated with said cord-circuit and adapted to cut the operator's telephone in circuit, a source of current associated with said cord-circuit and adapted to furnish current over said line when switched for conversation, two supervisory signals associated with said cord-circuit and adapted to be operated when connection is made with the line, and means for rendering said signals inoperative by a switch at the distant end of each of the lines, said switches controlling the current flowing over each of said lines, a test-responsive device associated with said cord-circuit and common to two or more of said cord-circuits and operated over a circuit of relatively high resistance, said circuit being completed between the testing-contact of the test-plug and the testing-contact of the line-terminal when the line tested is switched for conversation, an electromagnetic device associated with the said cord-circuit and controlling a contact in the circuit of one of said supervisory signals, said electromagnetic device being adapted to operate during conversation and to disconnect said test-receiving circuit and to substitute therefor a circuit adapted for conversation, whereby the operator may cut in her telephone-circuit by means of said cut-in key after connection has been established without reëstablishing the test-receiving circuit and whereby the line-circuit is subject to no undue disturbance when the test is made, substantially as described.

33. A telephone-line circuit provided with one or more spring-jack switches or line-terminals, one or each of said switches being provided with a testing-contact, said testing-contact being connected to one side of the talking-circuit of said line when switched for conversation, a cord-circuit terminating at one end in a plug provided with contact-terminals adapted to register with the contacts of said spring-jack switches, an operator's listening-in key associated with said cord-circuit and adapted to cut the operator's telephone into circuit, a source of current associated with said cord-circuit and adapted to furnish current over said line when switched for conversation, a supervisory signal associated with said cord-circuit and adapted to be operated when connection is made with a line and means for rendering said signal inoperative controlled by a switch at the distant end of the line-circuit, said switch altering the flow of current over said line, a test-responsive device associated with said cord-circuit and operated over a circuit of relatively high resistance, said circuit being completed between the testing-contact of the test-plug and the testing-contact of said line-terminal when the line tested is switched for conversation, an electromagnetic device associated with said cord-circuit and controlling the circuit of the said supervisory signal at one point and adapted to operate during conversation and to disconnect said test-receiving circuit and substitute therefor a circuit adapted for conversation, whereby the operator may cut her telephone into circuit without reëstablishing the test-receiving circuit and whereby the line-circuit is subject to no undue disturbance when the test is made, substantially as described.

34. A telephone-line circuit provided with one or more spring-jack switches or line-terminals, one or each of said switches being provided with a testing-contact, said testing-contact being connected to one side of the talking-circuit of said line when switched for conversation, a cord-circuit terminating at one end in a plug provided with contact-terminals adapted to register with the contacts of said spring-jack switches, a source of current associated with said cord-circuit and adapted to furnish current over said line when switched for conversation, a supervisory signal associated with said cord-circuit and adapted to be operated when connection is made with a line and means for rendering said signal inoperative controlled by a switch at the distant end of the line-circuit, said switch altering the flow of current over said line, a test-responsive device associated with said cord-circuit and operated over a circuit of relatively high resistance, said circuit being completed between the testing-contact of the test-plug and the testing-contact of said line-terminal when the line tested is switched for conversation, an electromagnetic device associated with said cord-circuit and controlling the circuit of the said supervisory signal at one point and adapted to operate during conversation and to disconnect said test-receiving circuit and substitute therefor a circuit adapted for conversation, substantially as described.

35. A telephone-line circuit provided with one or more spring-jack switches or line-terminals, one or each of said switches being provided with a testing-contact, said testing-contact being connected to one side of the talking-circuit of said line when switched for conversation, a cord-circuit terminating at one end in a plug provided with contact-terminals adapted to register with the contacts of said spring-jack switches, a source of current associated with said cord-circuit and adapted to furnish current over said line when switched for conversation, a supervisory signal associated with said cord-circuit and adapted to be operated when connection is made with a line and means to render said signal inoperative controlled by a switch at the distant end of the line-circuit, said switch altering the flow of current over said line, a test-responsive device associated with said cord-circuit and common to two or more of said cord-circuits and operated over a circuit of relatively high resistance, said circuit being completed between the testing-contact of the test-plug and the testing-contact of said line-terminal when the line tested is switched for conversation, an electromagnetic device associated with the said cord-circuit and controlling the circuit of the said supervisory signals at one point and adapted to operate during conversation and to disconnect said test-receiving circuit and substitute therefor a circuit adapted for conversation, substantially as described.

36. A telephone-line circuit provided with one or more spring-jack switches or line-terminals, one or each of said switches being provided with a testing-contact, said testing-contact being connected to one side of the talking-circuit of said line when switched for conversation, a cord-circuit terminating at one end in a plug provided with contact-terminals adapted to register with the contacts of said spring-jack switches, a source of current associated with said cord-circuit and adapted to furnish current over said line when switched for conversation, a test-responsive device associated with said cord-circuit and operated over a circuit of relatively high resistance, said circuit being completed between the testing-contact of the test-plug and the testing-contact of said line-terminal when the line tested is switched for conversation, an electromagnetic device associated with the cord-circuit and adapted to operate during conversation and to disconnect said test-receiving circuit and to substitute therefor a circuit adapted for conversation.

37. A telephone-line circuit provided with one or more spring-jack switches or line-terminals, one or each of said switches being provided with a testing-contact, said testing-contact being connected to one side of the talking-circuit of said line when switched for conversation, a cord-circuit terminating at one end in a plug provided with contact-terminals adapted to register with the contacts of said spring-jack switches, a source of current associated with said cord-circuit and adapted to furnish current over said line when switched for conversation, a test-responsive device associated with said cord-circuit and common to two or more of said circuits and operated over a circuit of relatively high resistance said circuit being completed between the testing-contact of the test-plug and the testing-contact of said line-terminal when the line tested is switched for conversation, an electromagnetic device associated with the said cord-circuit and adapted to operate during conversation and to disconnect said test-receiving circuit and to substitute therefor a circuit adapted for conversation.

38. A telephone-line circuit provided with one or more spring-jack switches or line-terminals, one or each of said switches being provided with a testing-contact, said testing-contact being connected to one side of the talking-circuit of said line when switched for conversation, a cord-circuit terminating at one end in a plug provided with contact-terminals adapted to register with the contacts of said spring-jack switches, a source of current associated with said cord-circuit and adapted to furnish current over said line when switched for conversation, a test-responsive relay common to two or more of said cord-circuits operated over a circuit including said source of current when the line tested is switched for conversation, said circuit being completed between said plug-testing contact and said jack-testing contact, a relay associated with said cord-circuit and said source of current and adapted to be maintained in operation over a circuit established through one side of the cord-circuit when the cord-circuit is connected for conversation, said relay being adapted when operated to disconnect said test-responsive relay and to substitute therefor a circuit adapted for conversation.

39. A telephone-line circuit provided with one or more spring-jack switches or line-terminals, one or each of said switches being provided with a testing-contact, said testing-contact being connected to one side of the talking-circuit of said line when switched for conversation, a cord-circuit terminating at one end in a plug provided with contact-terminals adapted to register with the contacts of said spring-jack switches, a source of current associated with said cord-circuit and adapted to furnish current over said line when switched for conversation, a supervisory signal associated with said cord-circuit and adapted to be operated when connection is made with a line, and means to render said signal inoperative controlled by a switch at the distant end of the line-circuit, said switch altering the flow of current over said line, a test-responsive relay common to two or more of said cord-circuits operated over a circuit including said source of current when the line tested is switched for conversation, said circuit being completed between said plug-testing contact and said jack-testing contact, a relay associated with said cord-circuit and said source of current and adapted to be maintained in operation over a circuit established through one side of the cord-circuit when the cord-circuit is connected for conversation, said relay being adapted when operated to close at one point the circuit containing said supervisory signal and to disconnect said test-responsive relay and to substitute therefor a circuit adapted for conversation.

40. In a telephone system, the combination of a cord-circuit consisting of two talking strands terminating at one end in a plug adapted for the testing and connection of telephone-lines, of a source of current associated therewith, a test-responsive device operated over a circuit of relatively high resistance normally connected to the testing-contact of said plug, a line-terminal consisting of two contacts adapted to register with the contacts of said plug, one of said contacts being in connection with one side of the talking-circuit when the line is switched for conversation, said testing-circuit including a source of current and being completed between the test-contact of the said plug and the test-contact of the said line-terminal, a relay associated with said cord-circuit and adapted to be maintained in operation during conversation over a local circuit not under the control of the subscriber, said relay being adapted when operated to remove the high-resistance testing-circuit and to substitute therefor a circuit adapted for conversation.

41. In a multiple-switchboard telephone-exchange system, the combination with telephone-lines extending from subscribers' stations to the line-jacks upon the different boards or sections of a multiple switchboard, of test-thimbles for the said jacks, cord-connecting apparatus at each board or section of the exchange including a connecting-plug for connecting a calling with a called subscriber, a switch provided with a normal and an alternate contact, a testing-conductor terminating in the normal contact, a test-responsive device in circuit with the test-conductor, a test-battery connected at the remaining terminal of the said test-conductor while the alternate contact constitutes the terminal of the answering end of the tip-strand, a connection between the remaining terminal of the test-battery and the sleeve-strands of the cord-circuits, whereby the test-thimbles may be connected with the said remaining terminal of the test-battery and circuit through the testing appliance completed upon the application of the connecting-plug to a test-thimble of a busy line, a relay in the conductor extending between the test-battery and the sleeve of the connecting and testing plug, and means controlled by the connecting-plug and the called-subscriber's jack for closing circuit through the said relay, whereby the said switch may be thrown from its normal test-contact to the alternate contact that is a terminal of the answering-section of the tip-strand, whereby the cord-circuit is completed, substantially as described.

42. In a multiple-switchboard telephone-exchange system, the combination with telephone-lines extending from subscribers' stations to the line-jacks upon the different boards or sections of a multiple switchboard, of test-thimbles for said jacks, cord-connecting apparatus at each board or section of the exchange, including a connecting-plug for connecting a calling with a called subscriber, a switch provided with a normal and an alternate contact, a testing-conductor terminating in the normal contact, a test-responsive device in circuit with the test-conductor, a test-battery connected at the remaining terminal of the said test-conductor while the alternate contact constitutes the terminal of the answering end of the tip-strand, a connection between the remaining terminal of the test-battery and the sleeve-strands of the cord-circuits whereby the test-thimbles may be connected with the said remaining terminal of the test-battery and circuit through the testing appliance completed upon the application of the connecting-plug to a test-thimble of a busy line, and a relay in the conductor extending between the test-battery and the sleeve of the connecting and testing plug, the called-subscriber's telephone-line, in coöperation with his spring-jack and the connecting-plug inserted therein, serving to complete circuit through the relay to disconnect the terminal of the connecting or testing plug section of the tip-strand and to complete the cord-circuit, substantially as described.

43. In a multiple-switchboard telephone-exchange system, the combination with telephone-lines extending from subscribers' stations to the line-jacks upon the different boards or sections of a multiple switchboard, of test-thimbles for the said jacks, cord-connecting apparatus at each board or section of the exchange, including a connecting-plug for connecting a calling with a called subscriber, a switch provided with a normal and an alternate contact, a testing-conductor terminating in the normal contact, a test-indicator in circuit with the test-conductor, a test-battery connected at the remaining terminal of the said test-conductor while the alternate contact constitutes the terminal of the answering end of the tip-strand, a connection between the remaining terminal of the test-battery and the sleeve-strands of the cord-circuits, whereby the test-thimbles may be connected with the said remaining terminal of the test-battery and circuit through the testing appliance completed upon the application of the connecting-plug to a test-thimble of a busy line, a relay in the conductor extending between the test-battery and the sleeve of the connecting and testing plug, and means controlled by the connecting-plug, and the called-subscriber's jack for closing circuit through the said relay, whereby the said switch may be thrown from its normal test-contact to the alternate contact that is a terminal of the answering-section of the tip-strand, whereby the cord-circuit is completed, substantially as described.

44. In a multiple-switchboard telephone-exchange system, the combination with telephone-lines extending from subscribers' stations to the line-jacks upon the different boards or sections of a multiple switchboard, of test-thimbles for said jacks, cord-connecting apparatus at each board or section of the exchange including a connecting-plug for connecting a calling with a called subscriber, a switch provided with a normal and an alternate contact, a testing-conductor terminating in the normal contact, a test-indicator in circuit with the test-conductor, a test-battery connected at the remaining terminal of the said test-conductor while the alternate contact constitutes the terminal of the answering end of the tip-strand, a connection between the remaining terminal of the test-battery and the sleeve-strands of the cord-circuits whereby the test-thimbles may be connected with the said remaining terminal of the test-battery and circuit through the testing appliance completed upon the application of the connecting-plug to a test-thimble of a busy line, and a relay in the conductor extending between the test-battery and the sleeve of the connecting and testing plug, the called-subscriber's telephone-line in coöperation with his spring-jack and the connecting-plug inserted therein, serving to complete circuit through the relay to disconnect the terminal of the connecting or testing plug section of the tip-strand and to complete the cord-circuit, substantially as described.

45. In a multiple-switchboard telephone-exchange system, the combination with telephone-lines extending from subscribers' stations to the line-jacks upon the different boards or sections of a multiple switchboard, of test-thimbles for the said jacks connected with one side of the talking-circuit, cord-connecting apparatus at each board or section of the exchange comprising a plurality of cord-circuits each having a connecting-plug for connecting a calling with a called subscriber, a switch provided with a normal and an alternate contact, a testing-conductor having a portion common to a plurality of said cord-circuits and terminating in the said normal contact, a test device responsive to a flow of current over the test-conductor, a test-battery having connection with the remaining terminal of the said test-conductor, the said alternate contact constituting the terminal of the answering end of the tip-strand of the cord-circuit, a connection between the remaining terminal of the test-battery and the sleeve-strands of the cord-circuits, whereby when a connection is established the test-thimbles are connected with the said remaining terminal of the test battery and circuit through the testing-conductor is completed upon the application of the connecting-plug to a test-thimble of a busy line, a relay in a conductor extending between the test-battery and one of the main contacts of the connecting and testing plug, and means controlled by the connecting-plug and a subscriber's jack for closing circuit through the said relay, whereby the said switch may be thrown during an established connection from its normal test-contact to the alternate contact that is a terminal of the answering-section of the tip-strand, whereby the cord-circuit is completed, substantially as described.

46. In a multiple-switchboard telephone-exchange system, the combination with telephone-lines extending from subscribers' stations to the line-jacks upon the different boards or sections of a multiple switchboard of test-thimbles for said jacks directly connected with one side of the talking-circuits, cord-connecting apparatus at each board or section of the exchange, including a plurality of cord-circuits and connecting-plugs for connecting calling and called subscribers together for conversation, a switch for each cord-circuit provided with a normal and an alternate contact, a testing-conductor terminating in the normal contact of each switch and having a portion common to a plurality of said cord-circuits, a test device in the common portion of the test-conductor and responsive to current thereover, a test-battery having connection with the remaining terminal of the said test-conductor while the said alternate contact constitutes the terminal of the answering end of the tip-strand of the cord-circuit, a connection between the remaining terminal of the test-battery and the sleeve-strands of the cord-circuits whereby the test-thimbles are connected with the said remaining terminal of the test-battery when a connection exists and circuit through the testing device is completed upon the application of the connecting-plug to a test-thimble of a busy line, and a relay actuated by current from the test-battery over one of the talking-strands of the cord-circuit and main contact of the connecting and testing plug when a connection exists, said relay serving to actuate said switch to disconnect the terminal of the connecting or testing plug section of the tip-strand and to complete the cord-circuit for talking substantially as described.

Signed by me at Chicago, county of Cook, State of Illinois, this 29th day of January, 1903.

WILLIAM W. DEAN.

Witnesses:
ROBERT LEWIS AMES,
GAZELLE BEDER.